(12) United States Patent
deRuijter et al.

(10) Patent No.: US 7,903,672 B1
(45) Date of Patent: Mar. 8, 2011

(54) SIGNALING PROTOCOL REGISTRATION LOAD REDUCTION

(75) Inventors: Denis H. deRuijter, Harvard, MA (US); Steve Onishi, Groton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1053 days.

(21) Appl. No.: 11/215,093

(22) Filed: Aug. 30, 2005

(51) Int. Cl.
*H04L 12/28* (2006.01)

(52) U.S. Cl. ........................................ 370/401; 370/230.1
(58) Field of Classification Search .................. 370/229, 370/230, 230.1, 235, 352, 353, 354, 355, 370/356, 401, 389, 410
See application file for complete search history.

(56) References Cited

U.S. PATENT DOCUMENTS

| | | | | |
|---|---|---|---|---|
| 5,987,606 | A * | 11/1999 | Cirasole et al. ................. | 726/11 |
| 6,501,767 | B1 * | 12/2002 | Inoue et al. ................... | 370/465 |
| 6,832,321 | B1 * | 12/2004 | Barrett ............................ | 726/11 |
| 7,069,338 | B2 * | 6/2006 | Popovich et al. ............. | 709/238 |
| 2006/0085548 | A1 * | 4/2006 | Maher et al. ................... | 709/227 |

\* cited by examiner

*Primary Examiner* — Ricky Ngo
*Assistant Examiner* — Christine Ng
(74) *Attorney, Agent, or Firm* — Shumaker & Sieffert, P.A.

(57) ABSTRACT

An intermediate device is described that reduces the number of signaling registration requests and responses flowing across a network. For example, a load reducing device intercepts the registration requests, filters a portion of the requests, and outputs autonomous response for each filtered registration request. The load reducing device forwards an unfiltered portion of the registration requests sufficient to maintain registration of the requesting device. The autonomous responses keep a logical pinhole in a firewall in an open state so that the registering device behind the firewall can receive session initiation invitations. At the same time, filtering the portion of the requests reduces the number of requests and responses that traverse any intermediate networks between the load reducing device and an intended recipient of the request.

8 Claims, 7 Drawing Sheets

SIGNALING PROTOCOL REGISTRATION LOAD REDUCTION

TECHNICAL FIELD

The invention relates to computer networks and, in particular, to signaling over a computer network.

BACKGROUND

Network telephony is a system through which users can engage in live voice conversations using a computer network, such as the Internet, as a medium of transmission. From a user's perspective, a network telephone behaves similarly to a conventional telephone. However, a network telephone is actually a network device, more similar to a personal computer than to a conventional telephone. Because the network telephone is a network device, the network telephone has a network address and communicates with other network devices using network packets.

While simple in theory, network telephony is complex in practice. For instance, a network telephone must register with a network telephony service provider in order to receive calls. Moreover, the network telephone must periodically renew this registration to ensure that other telephones can locate the network telephone in the event the network telephone physically moves or is reassigned a different network address.

In some respects, the advent of firewall technology has made network telephony more difficult. In general, a firewall blocks undesired incoming packets addressed to a set of protected network devices, but does not block outgoing packets from leaving the protected network devices. In addition, the firewall allows the protected devices to receive packets sent in direct response to the packets sent out by the protected devices. In other words, sending a packet out through the firewall creates a logical "pinhole" through which response packets may traverse the firewall. To guarantee maximum security and conserve resources, the firewall typically closes the pinhole within a given time unless traffic continues to flow through the pinhole. For example, the firewall may be configured to automatically close the pinhole after one minute of inactivity.

When a network telephone registers with the network telephony service provider, the network telephone sends one or more packets out through the firewall, thereby creating a pinhole for packets arriving from the network telephony service provider. Because an invitation to initiate a call arrives from the network telephony service provider, the invitation may use this pinhole to arrive at the network telephone. However, the firewall may have closed the pinhole in the time between forwarding the registration request and receiving the invitation. If the pinhole has closed, the firewall blocks the invitation and the receiving network telephone is prevented from receiving the invitation. To prevent this scenario, the network telephone reregisters itself in a period shorter than the time in which the firewall closes the pinhole. For example, if the firewall closes a pinhole after one minute of inactivity, the network telephone may be forced to reregister every 30 seconds in order to guarantee that the pinhole remains open.

Keeping the pinhole open by reregistering every 30 seconds generates a significant amount of network traffic. In addition to the frequent registration requests, the network telephony service provider sends a response packet back to the network telephone in response to each registration request. If there are a large number of network telephones on a network, the burden of handling registration requests and responses at such a high frequency may consume resources and negatively impact the performance of networks through which the registration requests and responses travel. For example, network congestion could increase, routers may drop packets, quality of service may suffer, and registration messages may not reach the network telephony service provider. Such performance problems may increase as more residential and enterprise users convert from conventional telephones to network telephony, and, in particular, to Voice over Internet Protocol (VoIP) technology. Registration for network telephony is one example of many applications that use signaling protocols to register their presence to an application service provider. Many of these applications face the same problem in maintaining an open pinhole through a firewall.

SUMMARY

In general, the invention is directed to techniques for reducing the number of signaling protocol packets flowing across a network when registering or reregistering with an application service provider. In particular, a load reducing device intercepts registration requests from an initiating device, such as a network telephone, and allows only a portion of the registration requests to proceed to the intended recipient of the request. For the remainder of the registration requests, the load reducer sends an autonomous response back to the initiating device without forwarding the requests. In this way, the load reducing device significantly diminishes the number of registration requests and responses flowing across the network between the load reducing device and the recipient.

In one embodiment, a method comprises intercepting with an intermediate device registration requests from a network telephony device to a telephony service provider. The method then requires forwarding a portion of the registration requests from the intermediate device to the telephony service provider sufficient to maintain registration of the network telephony device with the telephony service provider. In addition, the method requires responding to a remaining portion of the registration requests with the intermediate device on behalf of the telephony service provider.

In another embodiment, an intermediate networking device comprises an interceptor module to intercept requests from a network telephony device to a telephony service provider and responses from the telephony service provider to the network telephony device. The intermediate networking device also comprises a signaling processor to respond to a portion of the intercepted requests on behalf of the telephony service provider and forwards a remaining portion of the intercepted requests to the telephony service provider, wherein the remaining portion contains enough requests that the network telephony device remains registered with the telephony service provider.

In another embodiment, the invention comprises a computer-readable medium containing instructions. The instructions cause a programmable processor to intercept registration requests sent by a network telephony device and responses sent by a telephony service provider in response to the requests. Further, the instructions cause the processor to respond to a portion of the requests on behalf of the telephony service provider. In addition, the instructions cause the processor to forward to the telephony service the requests not in the portion.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
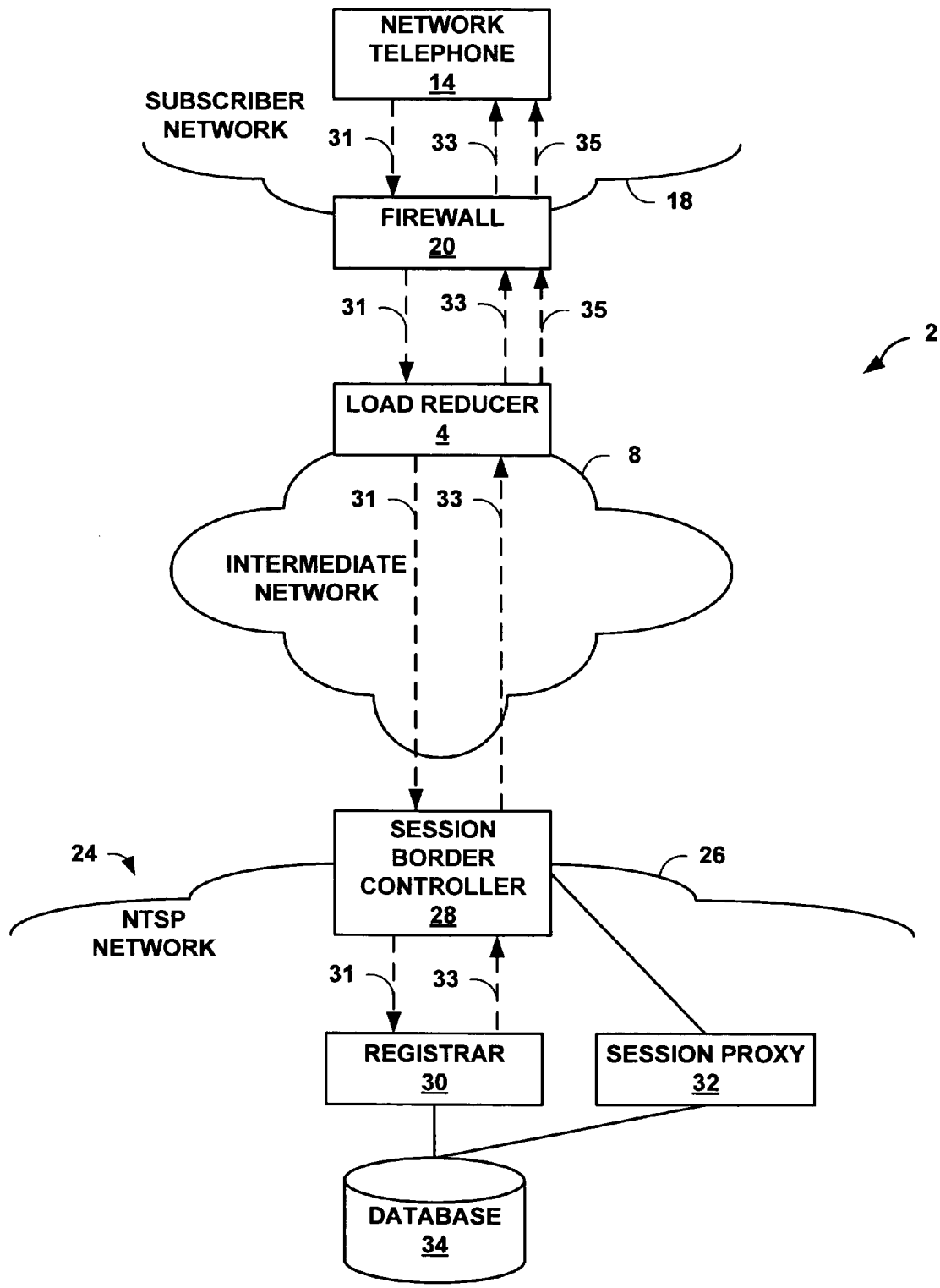
FIG. 1 is a block diagram illustrating an exemplary system in which a load reducing device reduces signaling messages consistent with the principles of the invention.

FIG. 1 is a block diagram illustrating an exemplary computing environment 2 in which a load reducer 4 reduces signaling messages through an intermediate network 8 consistent with the principles of the invention. In this example, an Internet Service Provider (ISP) facilitates communication between a network telephony service provider (NTSP) 24 and a series of subscriber devices through an intermediate network 8. NTSP 24 provides a network 26 that contains a session border controller (SBC) 28, a registrar 30, a session proxy 32, and a registration database 34. In the example of FIG. 1, the subscriber devices include a network telephone 14 located in a subscriber network 18 protected by firewall 20.

Network telephone 14 initiates the registration process by sending a registration request 31. Network telephone 14 may use a signaling protocol such as the Session Initiation Protocol (SIP) to encode registration request 31. Registration request 31 initially travels from network telephone 14 through subscriber network 18 to firewall 20. Based on the outbound message, firewall 20 creates a logical pinhole to allow any inbound response packets to reach network telephone 14. Firewall 20 then forwards registration request 31 to Intermediate network 8 for transmission to NTSP 24.

Load reducer 4 intercepts registration request 31 before the registration request arrives at NTSP 24. In one embodiment, load reducer 4 intercepts registration request 31 at an edge of intermediate network 8 close to firewall 20. If load reducer 4 has no record of a prior registration request from network telephone 14, load reducer 4 records information in registration request 31 pertinent to creating an autonomous registration response packet. An autonomous registration response mimics the registration response from NTSP 24. Load reducer 4 then allows the request to access intermediate network 8 and continue to NTSP 24. However, if load reducer 4 has a record of a prior registration request from network telephone 14, load reducer 4 determines when a previous registration request has been sent from network telephone 14 to NTSP 24. If a previous registration request has been recently sent such that registration of network telephone 14 will not be affected, load reducer 4 sends an autonomous response 35 back to network telephone 14 without allowing registration request 31 to access intermediate network 8. Because the autonomous response 35 has substantially the same content as a real registration response 33 sent by NTSP 24, network telephone 14 may not detect that the response is an autonomous response. In this manner, the actions of load reducer 4 may be transparent to network 14, firewall 20, and possibly even NTSP 24.

In conventional fashion, registrar 30 receives any registration requests 31 not filtered by load reducer 4, and processes the registration requests to register network telephone 14 for telephony service. In particular, upon receiving a registration request, registrar 30 records information contained in registration request 31 in registration database 34 and sends a registration response 33 to network telephone 14. Registration response 33 typically indicates acceptance or denial of registration request 31. For accepted registration requests, registration response 33 contains information describing an amount of time before the registration expires. For example, in conventional fashion, registrar 30 may set the expiration period of registration to three or four hours.

NTSP 24 may utilize SBC 28 to further process communications between network telephone 14 and registrar 30. In some instances, SBC 28 may operate as a gateway for NTSP 24. In this case, when network telephone 14 sends a registration request to NTSP 24, SBC 28 receives registration request 31 and responds as though SBC 28 were registrar 30. Thus, when SBC 28 operates as a gateway, SBC 28 appears to network telephone 14 as registrar 30. SBC 28 forwards each the request to registrar 30 to register network telephone.

In some cases, SBC 28 may transparently modify the registration responses from registrar 30. In particular, SBC 28 may transparently changes the registration expiration period set within registration response 33. For example, SBC 28 may change the expiration period from an original value (e.g., three or four hours) to a shorter value (e.g., 30 seconds) in order to assure that firewall 20 maintains a logical pinhole through which network telephone may receive network telephony calls. As discussed above, firewall 20 may be configured to automatically close a pinhole after a period of inactivity (e.g., one minute). Thus, although an expiration period of three or four hours may be acceptable to registrar 30, such an expiration period may result in a general inability of network telephone 14 to receive calls for the majority of the registration period. Use of SBC 28 to transparently modify the expiration period to a shorter value (e.g., 30 seconds) guarantees that the pinhole remains open through firewall 20. SBC 28 may modify all registration responses 33 issued by registrar 30, or may modify only those responses that match certain criteria (e.g., destination network and media access control ("MAC") addresses). In some cases, load reducer 4 and SBC 28 cooperate to exchange registration frequency information. SBC 28 sends the altered registration response 33 to network telephone 14.

Before registration response 33 arrives at network telephone 14, load reducer 4 intercepts the registration response. Load reducer 4 analyzes registration response 33 to extract information pertinent to creating autonomous response 35. Load reducer 4 then stores the extracted information and allows the response to proceed to network telephone 14.

Session proxy 32 assists in the set up, modification, and tear-down of a network telephony session. For example, when a second network telephone (not shown in FIG. 1) attempts to initiate communication with network telephone 14, the second network telephone in effect sends a request to session proxy 30 to send an invitation to network telephone 14. The invitation passes through the same pinhole in firewall 20 used by the registration request 31, registration response 33 and autonomous registration response 35. In this manner, the pinhole in firewall 20 may be maintained in an open state to receive such invitations due to registration requests 31 being issued by network telephone 14 at a high rate (e.g., every 30 seconds), and intermediate network 8 need not be burdened by these requests due to load reducer 4 and autonomous responses 35.

Figure 2:
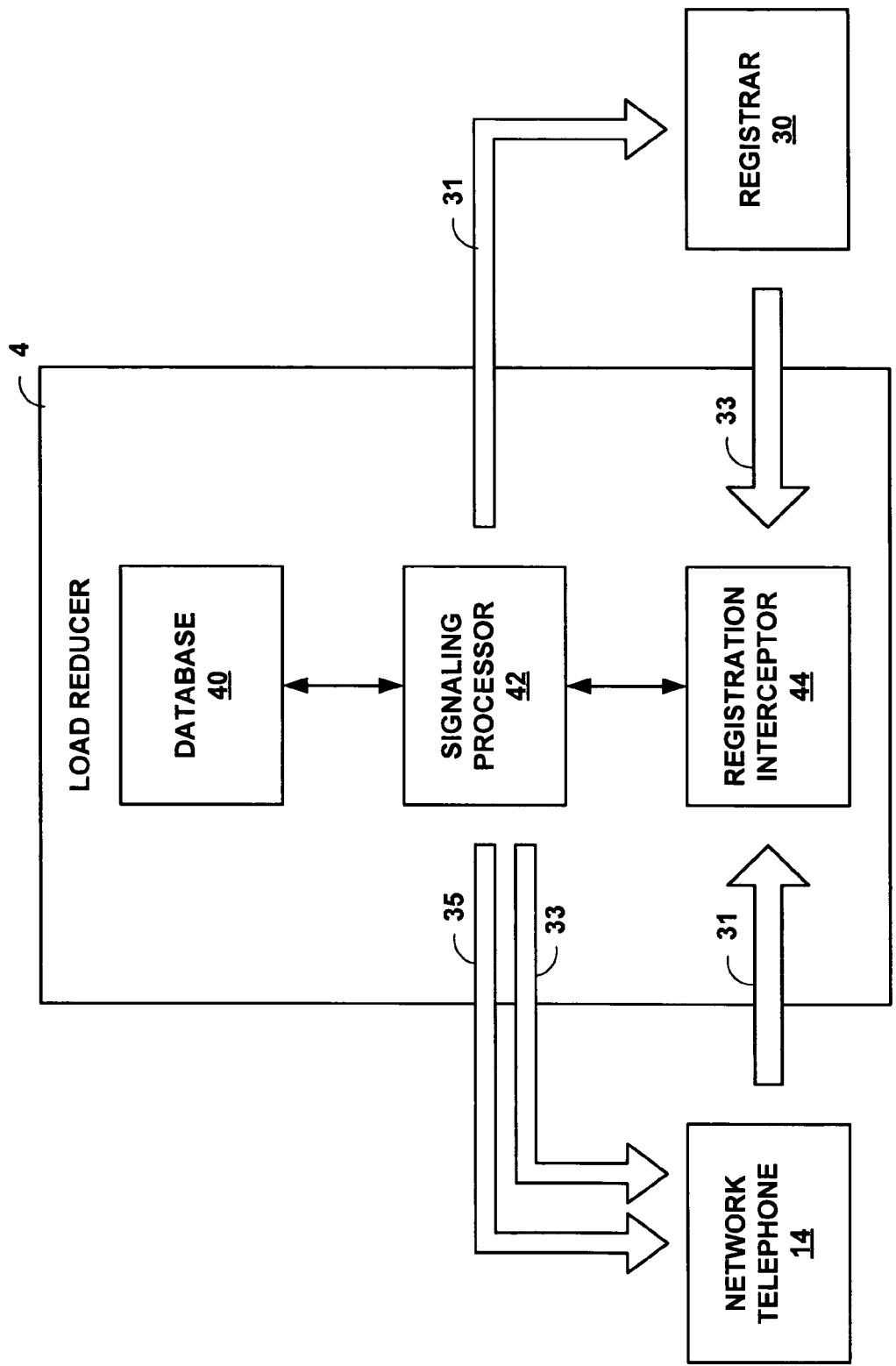
FIG. 2 is a block diagram illustrating an exemplary embodiment of a load reducing device consistent with the principles of the invention.

FIG. 2 is a block diagram illustrating an example embodiment of load reducer 4. In this example embodiment, load reducer 4 includes a registration database 40, a signaling processor 42, and a registration interceptor 44.

Registration interceptor 44 transparently inspects network communications for registration requests and registration responses. FIG. 2 illustrates registration requests 31 and registration responses 33 as separate flows even though registration requests 31 and registration responses 33 may travel over the same physical interfaces in computing environment 2.

Registration interceptor 44 may identify registration requests 31 and registration responses 33 in a number of ways. For instance, registration interceptor 44 may deeply inspect packets and packet flows as the packets pass through registration interceptor 44. That is, if the packets or packet flows match certain patterns, registration interceptor 44 identifies the packets as registration request or response packets. Alternatively, registration interceptor 44 may identify registration requests 31 and registration responses 33 based on the protocol field of the Internet protocol (IP) header and a well-known or otherwise identified port for network telephony signaling. Registration interceptor 44 forwards non-registration packets to their intended destinations without modification.

When registration interceptor 44 identifies packets carrying a registration request 31 or a registration response 33, registration interceptor 44 sends the registration request 31 or registration response 33 to signaling processor 42 for further processing. On the other hand, if registration interceptor 44 detects a packet that does not contain a registration request or response, registration interceptor 44 forwards the packet without further processing.

Signaling processor 42 receives and analyzes registration requests 31 and registration responses 33. For example, when signaling processor 42 receives registration request 31 from registration interceptor 44, signaling processor 42 examines the content of registration request 31 for information identifying the source and destination of the registration request. For example, the identifying information may include source and destination network addresses and ports. Using the identifying information, signaling processor 42 queries database 40 to discover whether there is a registration transaction entry in database 40 corresponding with registration request 31. If database 40 does not contain a registration transaction entry corresponding with the identifying information, signaling processor 42 creates a registration transaction entry in database 40. The registration transaction entry stores information from registration request 31 pertinent to creating an autonomous registration response 35. After creating the registration transaction entry, signaling processor 42 may modify registration request 31 before sending registration request 31 to registrar 30. For example, signaling processor 42 may modify registration request 31 to let SBC 28 know that load reducer 4 lies between SBC 28 and network telephone 14.

On the other hand, if database 40 contains a registration transaction entry corresponding with the identifying information of registration request 31 and the expiration period is not close to expiring, signaling processor 42 uses information contained in the registration transaction entry to generate autonomous registration response 35. Signaling processor 42 sends autonomous registration response 35 back to network telephone 14, and directs registration interceptor 44 to filter (e.g., drop) registration request 31 without sending the request to registrar 30. If signaling processor 42 detects that the registration period is close to expiring (e.g., more than a specified number of autonomous response packets have been sent without re-registering), signaling processor 42 deletes or otherwise modifies the registration transaction entry from database 40. Deleting or otherwise modifying the registration transaction entry has the effect of allowing the next registration request 31 from network telephone 14 to reach registrar 30 and restarting the registration period.

When signaling processor 42 receives registration response 33 from registrar 30, signaling processor 42 again examines the content of registration response 33 for identifying information. Signaling processor 42 then uses the identifying information to access database 40 and update the corresponding registration transaction entry to include information from registration response 33 pertinent to creating autonomous registration response 35. Signaling processor 42 may then modify registration response 33 before sending response 33 to network telephone 14.

Figure 3:
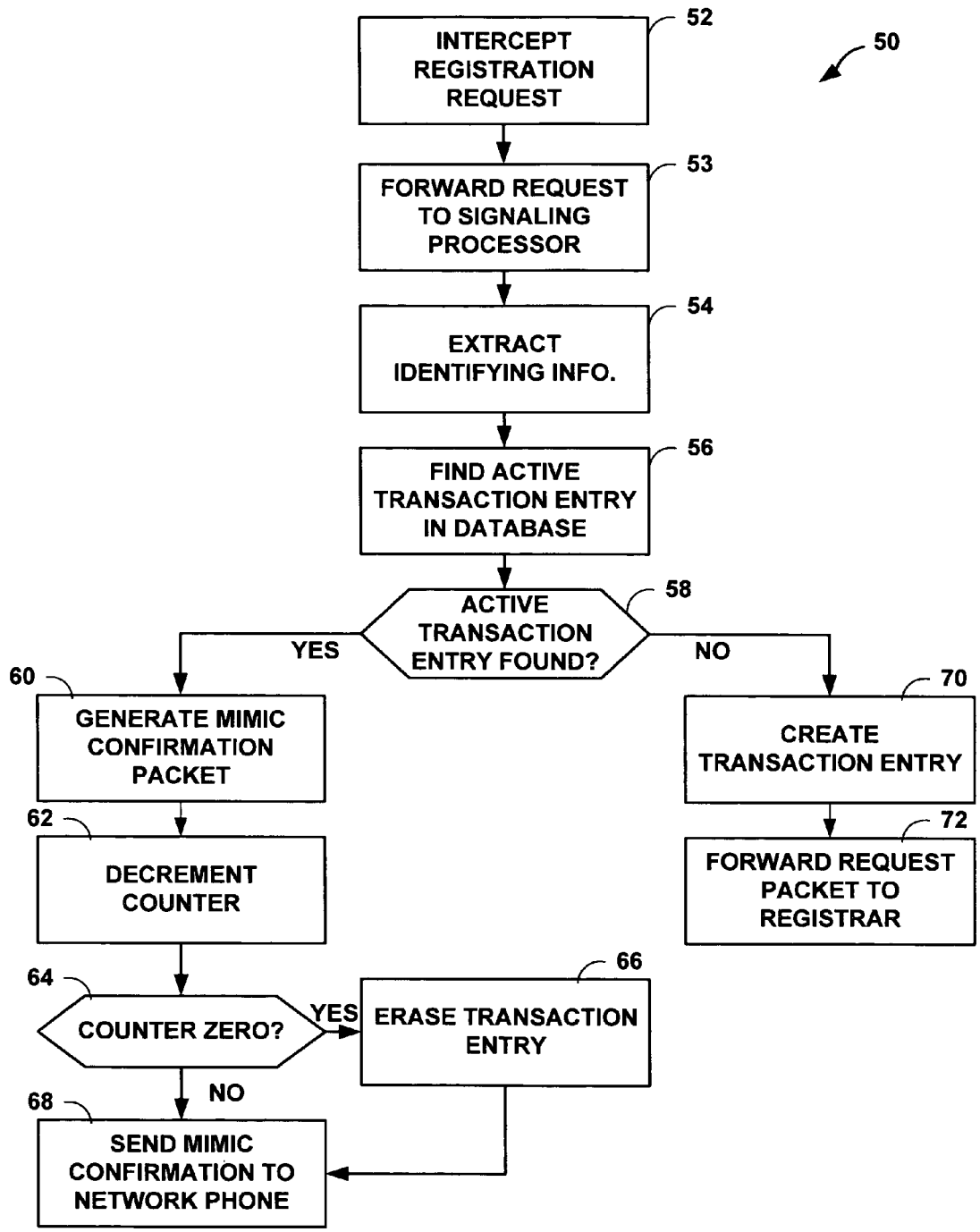
FIG. 3 is a flowchart illustrating an exemplary mode of operation when the load reducing device receives a registration request.

FIG. 3 is a flowchart illustrating an exemplary operation of load reducer 4 when receiving and processing registration request 31. Initially, a registration request process 50 begins when registration interceptor 44 intercepts registration request 31 (52). Registration interceptor 44 forwards the intercepted registration request 31 to signaling processor 42 (53).

Signaling processor 42 first extracts identifying information from registration request 31 (54). The identifying information may include the source and destination network address, source and destination MAC address, protocol and port associated with registration request 31, or further information located in the payload, such as SIP header fields. Further, the pertinent request information may include network or link level information needed to generate a well-formed autonomous response packet. Using the identifying information, signaling processor 42 queries database 40 for an active registration transaction entry (56). That is, signaling processor 42 queries database 40 for a registration transaction entry that has not yet expired and is not close to expiring (e.g., a threshold number of autonomous responses have not already been sent).

If registration database 40 contains a corresponding active registration transaction entry (58), signaling processor 42 uses the content of the active registration transaction entry to generate autonomous registration response 35 (60). Autonomous registration response 35 has substantially the same information as registration response 33 from registrar 30. After generating autonomous registration response 35, signaling processor 42 decrements a counter associated with the active registration transaction entry and updates database 40 to record that another autonomous response 35 has been created (62). Alternatively, signaling processor 42 may use some other mechanism to determine when a registration is about to expire. For example, signaling processor 42 may check or update a timestamp associated with the registration transaction entry. If the counter associated with the registration transaction entry is zero (64), then signaling processor 42 erases or otherwise makes the registration transaction entry inactive (66). Finally, signaling processor 42 sends autonomous registration response 35 to network telephone 14 (68).

If, on the other hand, database 40 does not contain a registration transaction entry corresponding with the identifying information from intercepted registration request 31 (58), signaling processor 42 creates a new registration transaction entry in database 40 (70). In creating the registration transaction entry, signaling processor 42 inserts all of the information in registration request 31 pertinent to creating autonomous registration response 35 into the new registration transaction entry. In addition, signaling processor 42 sets the counter of the registration transaction entry to N, where N is the number of requests that load reducer 4 should intercept before allowing a request to continue to registrar 30. After creating the registration transaction entry, signaling processor 42 allows registration interceptor 44 to forward registration request 31 to registrar 30 (72).

Figure 4:
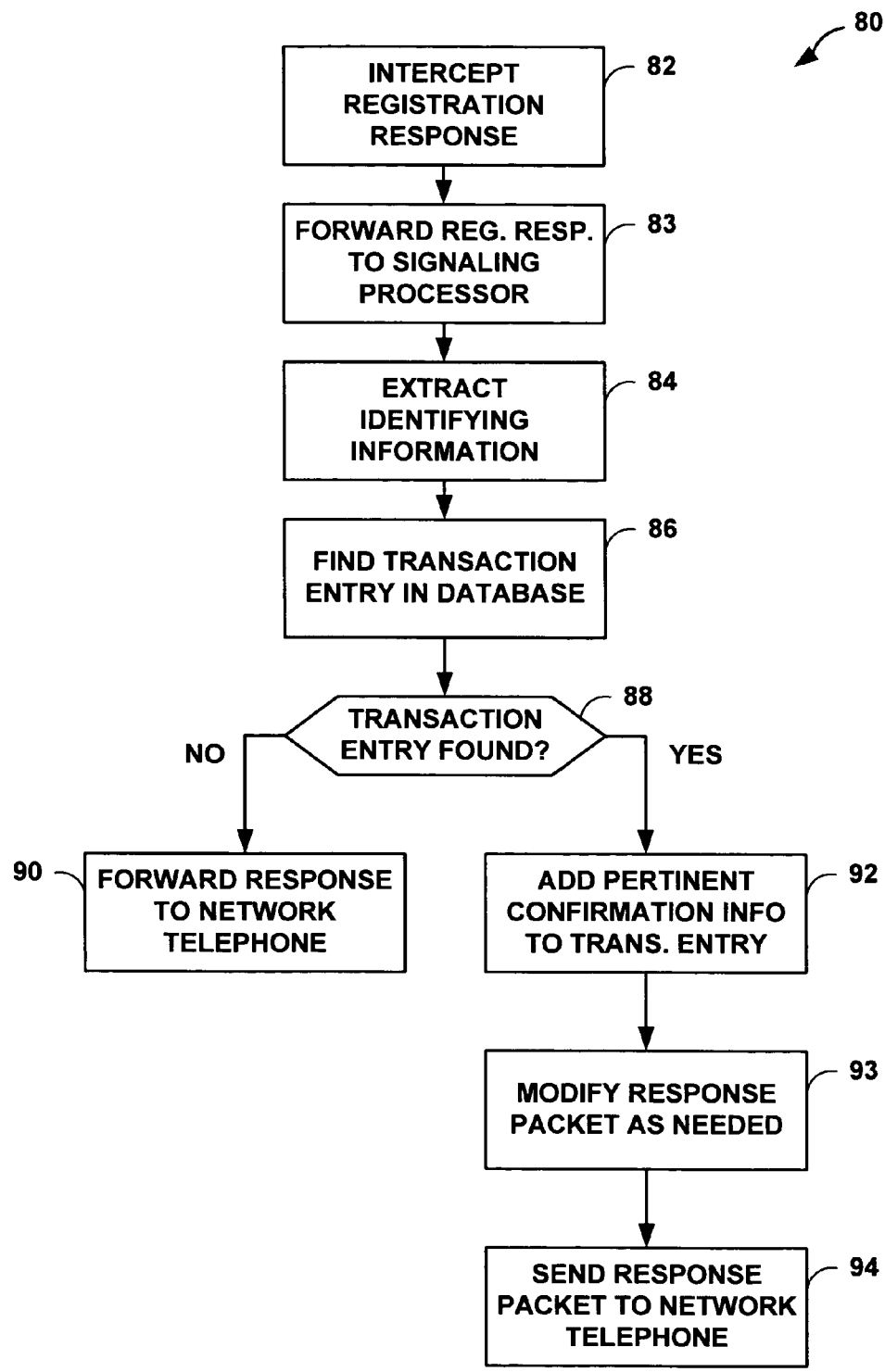
FIG. 4 is a flowchart illustrating an exemplary mode of operation when the load reducing device receives a registration response.

FIG. 4 is a flowchart illustrating an exemplary operation of load reducer 4 when receiving and processing registration response 33. Initially, a registration response process 80 begins when registration interceptor 44 intercepts registration response 33 (82). Registration interceptor 44 forwards registration response 33 to signaling processor 42 (83). When signaling processor 42 receives registration response 33, signaling processor 42 extracts identifying information from registration response 33 (84). In general, the identifying information of registration response 33 is sufficient to allow signaling processor 42 to associate registration response 33 with registration request 31. For example, the identifying information in registration response 33 may include source and destination network addresses, source and destination MAC addresses, SIP header fields, and protocol and port associated with registration request 31. Signaling processor 42 uses this derived identifying information to attempt to find a registration transaction entry in database 40 corresponding to the identifying information of registration request 31 (86).

If signaling processor 42 finds a registration transaction entry, signaling processor 42 adds information in registration response 33 pertinent to creating autonomous registration response 35 to the transaction entry (92). Once signaling processor 42 adds the pertinent response information to the transaction entry, signaling processor 42 may modify registration response 33 as needed (93). After performing such modifications, signaling processor 42 sends registration response 33 to network telephone 14 (94). On the other hand, if no transaction entry is found (88), signaling processor generates an error since the registration response does not match a previously intercepted registration request. In this case, signaling processor 42 nevertheless allows registration interceptor 44 to forward registration response 33 to network telephone 14 (90).

Figure 5:
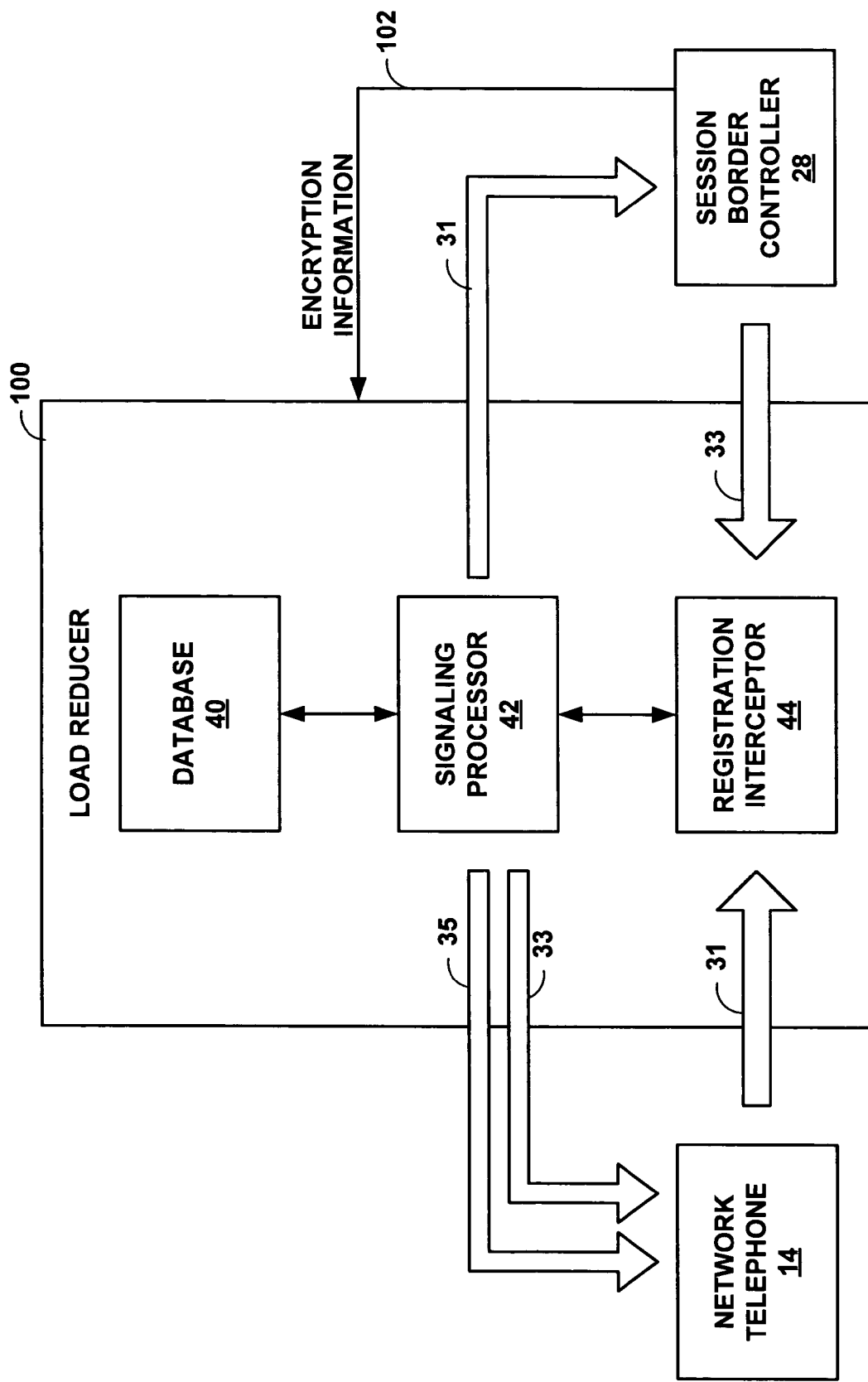
FIG. 5 is a block diagram illustrating another embodiment of a load reducing device consistent with the principles of the invention.

FIG. 5 is a block diagram illustrating another example embodiment of a load reducer 100 consistent with the principles of the invention. In most respects load reducer 100 operates similar to load reducer 4 of FIG. 2. However, in this embodiment one or more components of NTSP 24 (e.g., SBC 28) shares encryption information 102 with load reducer 100 to aid the interception of registration requests 31 and registration responses 33 flowing from network telephone 14. Similarly having access to encryption information 102 enables signaling processor 42 to perform cryptographic operations on registration responses 33. For instance, signaling processor 42 may use encryption information 102 to decrypt messages flowing from NTSP 24 and encrypt autonomous registration responses 35 flowing to network telephone 14. In some cases, signaling processor 42 receives encryption information 102 from SBC 28 when the SBC acts as a gateway for registrar 30. In this manner, SBC 28 and load reducer 100 may intelligently cooperate to reduce loading across intermediate network 8.

Figure 6:
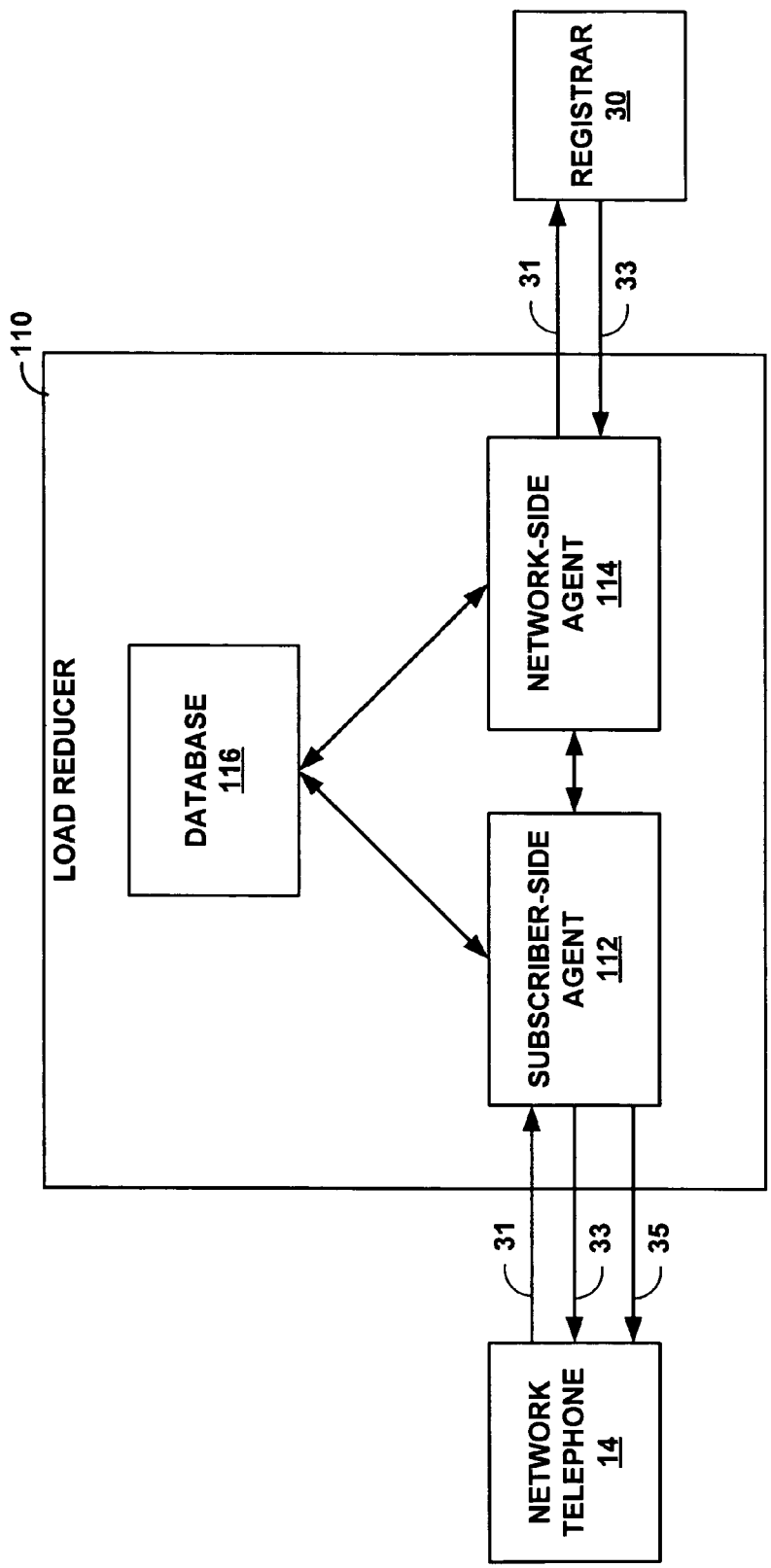
FIG. 6 is a block diagram illustrating another embodiment of a load reducing device consistent with the principles of the invention.

FIG. 6 is a block diagram illustrating another example embodiment of a load reducer 110 consistent with the principles of the invention. In this embodiment, load reducer 110 includes a subscriber-side agent 112, a network-side agent 114, and a database 116. Load reducer 110 uses subscriber-side agent 112 and network-side agent 114 as back-to-back user agents. That is, load reducer 110 acts as a proxy between network telephone 14 and the telephony service provider, e.g., SBC 28. In this manner, subscriber-side agent 112 responds on behalf of registrar 30 by processing registration requests 31 and generating registration responses 33 based on communications between network-side agent and registrar 30. Subscriber-side agent 112 and network-side agent 114 maintain database 116 to record information with respect to network telephone 14 for purposes of constructing autonomous registration responses 35 to reduce loading on intermediate network 8 as described above.

Figure 7:
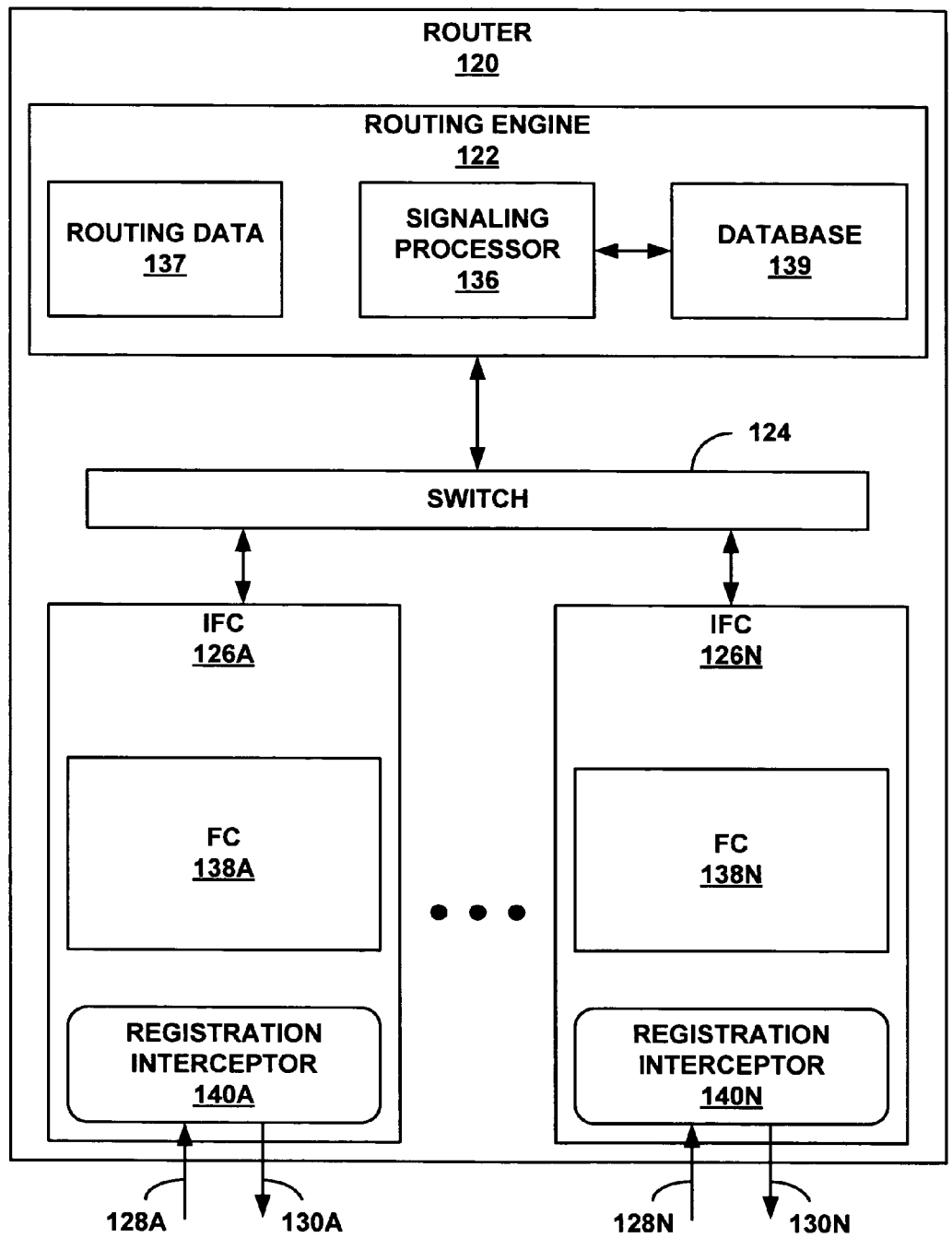
FIG. 7 is a block diagram illustrating an embodiment of a load reducing device as a router consistent with the principles of the invention.

FIG. 7 is a block diagram illustrating another embodiment of the invention in which router 120 incorporates load reducing capabilities in accordance with the principles of the invention. In this example, edge router 120 includes a routing engine 122, a high-speed switch 124, and a set of interface cards 126A-126N ("IFCs 126") that receive and send packets via network links 128A-128N and 130A-130N, respectively. Router 120 may include a chassis (not shown) having a number of slots for receiving a set of cards, including IFCs 126. Each card may be inserted into a corresponding slot of the chassis for electrically coupling the card to routing engine 122 via high-speed switch 124.

In general, routing engine 122 operates as a control unit for router 120, and maintains routing data 137 that reflects a topology of a network, e.g., intermediate network 8 of FIG. 1. Based on routing data 137, routing engine 122 generates forwarding data for use by forwarding components (FCs) 138A-138N of IFCs 126. Each of the FCs 138 forwards packets in accordance with the forwarding data generated by routing engine 122. Specifically, IFCs 126 determines a next hop for each inbound packet based on the forwarding information, identifies one or more corresponding IFCs associated with the next hop, and relays the packet to the appropriate one of IFCs 126 via switch 124.

To facilitate registration load reduction, interface cards 126 include registration interceptors 140. When a packet arrives at an interface card 126A, for example, registration interceptor 140A inspects the packet to determine whether the packet forms part of a registration request or registration response. If the packet is not part of a registration request or a registration response, registration interceptor 140A sends the packet to forwarding controller 138A to be forwarded back onto the network. However, if the packet is a registration request or response, registration interceptor 140A forwards the request or response to signaling processor 136 of routing engine 122.

Signaling processor 136 operates like signaling processor 42 in FIG. 2 and FIG. 3, described above. That is, signaling processor 136 collects information from registration requests and responses, stores the information in a database 139, generates autonomous registration responses, and modifies registration requests and responses. Further, signaling processor 136 may receive encryption information from a device associated with NTSP 24 and use the encryption information to decrypt registration requests for inspection and encrypt registration requests before routing registration requests to NTSP 24. FCs 138A-138N forward the registration requests, registration responses, and autonomous registration responses to the network through IFCs 128 along with other network traffic.

In other embodiments, the tasks of analyzing registration requests transactions and generating autonomous responses is distributed to the IFCs 126. Alternatively, the functions of packet inspections as well as response generation may be centralized within routing engine 122. In addition, switches, firewalls, or other networking devices could perform the tasks of analyzing registration requests and generating autonomous responses. Further, devices other than a network telephone may send the registration requests and receive the registration responses. For example, a device could send and receive the registration requests and responses on behalf of one or more conventional telephones.

Various embodiments of the invention have been described. These and other embodiments are within the scope of the following claims.

The invention claimed is:

1. A system comprising:
    a subscriber network comprising:
        a firewall device;
        a network telephony device that sends registration requests to a network telephony service provider (NTSP) network via the firewall device, wherein the registration requests maintain an open logical pinhole within the firewall device;
    a service provider network positioned between the subscriber network and the NTSP network, the service provider network including a layer three (L3) provider edge router;
    a session border controller (SBC) of the NTSP network that responds to registration requests from the network telephony device, wherein the SBC operates as a gateway to the NTSP network,
    wherein the firewall device of the subscriber network is positioned between the network telephony device and the service provider network,
    wherein the layer three (L3) provider edge router of the service provider network is positioned between the firewall device and the SBC of the NTSP network, and
    wherein the layer three (L3) provider edge router comprises:
        a routing engine configured to maintain routing data that reflects a topology of the service provider network;
        a plurality of interface cards to receive packets on the service provider network, wherein each of the interface cards includes a forwarding component programmed to forward the packets, wherein at least a portion of the packets include registration requests sent by the network telephony device and registration responses sent by the SBC; and
        a signaling processor that executes within the routing engine to respond to a filtered portion of the intercepted requests on behalf of the SBC by sending to the network telephony device autonomous responses mimicking the responses sent by the SBC and forward an unfiltered portion of the intercepted requests to the SBC via the service provider network, wherein the unfiltered portion includes a number of the requests sufficient to maintain the registration of the network telephony device with a registrar of the NTSP network,
    wherein each of the plurality of interface cards includes a corresponding registration interceptor module to intercept the registration requests from the network telephony device to the NTSP network and intercept registration responses from the SBC to the network telephony device, each of the registration interceptor modules configured to inspect the packets to determine those packets that form part of the registration requests or the registration responses, forward the packets to the signaling processor of the routing engine that form part of the requests and responses and forward any other ones of the packets to the forwarding components of the interface cards to be forwarded onto the NTSP network.

2. The system of claim 1,
    wherein the firewall closes the logical pinhole after a specific interval of inactivity,
    wherein the registration responses comprise a registration expiration period that directs the network telephony device to send a registration request to the NTSP network upon expiration of the registration expiration period, and
    wherein the registration expiration period is less than the specific interval.

3. The system of claim 1,
    wherein the layer 3 (L3) provider edge router further comprises a database, and
    wherein the signaling processor extracts response data pertinent to creating an autonomous response from the registration responses and stores the response data in the database.

4. The system of claim 3, wherein the signaling processor creates the autonomous responses from the response data stored in the database.

5. The system of claim 1, wherein the signaling processor receives encryption information from a device associated with the NTSP network and uses the encryption information to decrypt the registration requests for inspection and encrypt the registration requests before routing the registration requests to the NTSP network.

6. The system of claim 1, wherein the registration requests, registration responses, and autonomous responses conform to a signaling protocol.

7. The system of claim 6, wherein the signaling protocol is a Session Initiation Protocol.

8. The system of claim 1,
    wherein the network telephony device receives an invitation, from the NTSP network, to initiate a telephony session with a network device, and
    wherein the invitation traverses the firewall through the open logical pinhole.

* * * * *